United States Patent
Stevens, III

(10) Patent No.: US 8,521,839 B2
(45) Date of Patent: Aug. 27, 2013

(54) AUXILIARY EVENT PACKAGES

(75) Inventor: Ira C. Stevens, III, Quakertown, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 105 days.

(21) Appl. No.: 13/196,208

(22) Filed: Aug. 2, 2011

(65) Prior Publication Data
US 2013/0036189 A1 Feb. 7, 2013

(51) Int. Cl.
*G06F 15/16* (2006.01)
(52) U.S. Cl.
USPC .......................................................... 709/217
(58) Field of Classification Search
USPC .......................................................... 709/217
See application file for complete search history.

(56) References Cited

U.S. PATENT DOCUMENTS

| | | | |
|---|---|---|---|
| 6,460,036 B1 | 10/2002 | Herz | |
| 7,412,521 B2 | 8/2008 | Olson et al. | |
| 7,805,517 B2 | 9/2010 | Shim et al. | |
| 8,064,342 B2 | 11/2011 | Badger | |
| 2006/0168319 A1* | 7/2006 | Trossen | 709/238 |
| 2006/0246880 A1* | 11/2006 | Baldwin et al. | 455/414.2 |
| 2007/0168417 A1* | 7/2007 | Swanburg et al. | 709/203 |
| 2008/0101335 A1 | 5/2008 | Badger | |

* cited by examiner

*Primary Examiner* — Jason Gee

(57) ABSTRACT

A method includes registering with a proxy for an auxiliary event-package, wherein the auxiliary event-package is provided by a plurality of auxiliary event-package servers. The method may further include subscribing to the auxiliary event-package through the proxy. The proxy forwards the subscription to the plurality of auxiliary event-package servers. The method may include receiving an initial notify from one of the auxiliary event-package servers and identifying the one of the auxiliary event-package servers as a primary handle for the auxiliary event-package. In addition, the method may include identifying others of the plurality of auxiliary event-package servers as secondary handles for the auxiliary event-package.

18 Claims, 7 Drawing Sheets

AUXILIARY EVENT PACKAGES

BACKGROUND INFORMATION

Many network providers are migrating to communication networks that employ session control protocols, such as Session Initiation Protocol (SIP). SIP is a session signaling protocol for creating, modifying, and terminating sessions at the application layer. SIP may create, modify, and terminate sessions (e.g., telephone calls, instant messaging conferences) among participants of the session. Proxies are typically employed to handle session signaling on behalf of devices in the SIP oriented network. The proxy may handle session signaling for many (e.g., thousands or millions) devices.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

An event-package is a service on a network for which a device may subscribe and receive notifications of events. Event-packages in SIP oriented networks are implemented in a published and subscribed based architectural pattern ("pub/sub model"). In other words, the SIP event-package may be a hub of a particular feature set, such as presence, which is distributed to subscribers. SIP event-packages are often tightly integrated with a SIP soft-switch, which may be clustered and load balanced.

Embodiments disclosed herein relate to devices, methods, and systems for implementing a SIP client centric server-affinity that allows failover and load balancing of a SIP oriented network. In some instances, SIP event-packages are auxiliary to the soft-switch in SIP oriented networks and may be unknown to the SIP soft-switch, SIP gateway or proxy, and/or added as a third party to the soft-switch (i.e., customer premises equipment, cloud services, etc.). The presence of these auxiliary event-packages in the SIP oriented networks increases the difficulty of load-balancing the SIP oriented networks. The difficulty of load-balancing may be further increased when the auxiliary event-packages serve a plurality of soft-switches, gateways or proxies. Consistent with the embodiments described herein, SIP oriented networks may be implemented with either SIP user agent centric server-affinity or user device centric server-affinity that enables failover, load balancing, and/or reconnection across the SIP oriented network.

Figure 1A:
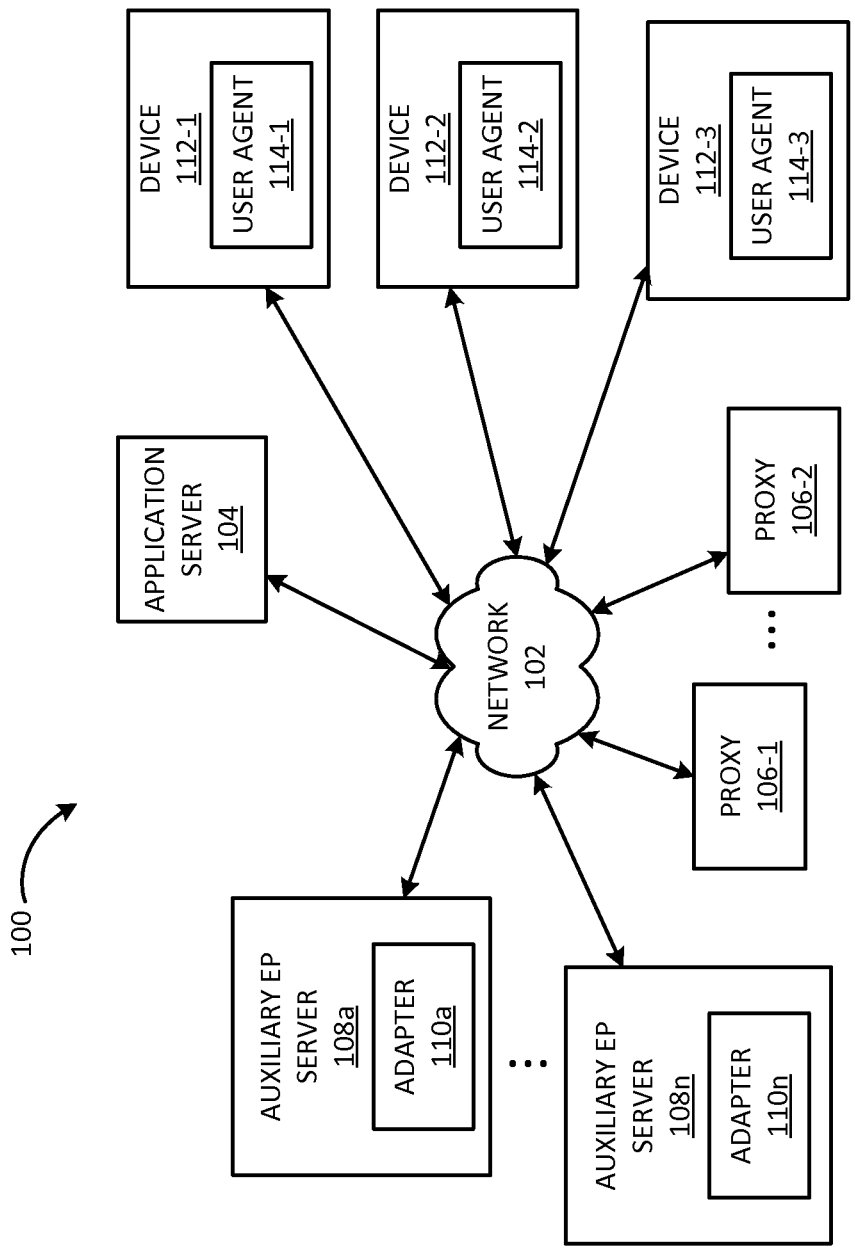
FIG. 1A is a block diagram of exemplary components of a network for implementing embodiments disclosed herein.

FIG. 1A is a diagram of an exemplary network 100 in which systems and/or methods described herein may be implemented. As illustrated, network 100 may include an application server 104, a plurality of proxies 106 (individually, "proxy 106-$x$"), a plurality of auxiliary event-packages servers (AEPSs) 108$a$-108$n$, and numerous user devices 112 (individually, "user device 112-$x$") coupled to a network 102. Components of network 100 may be interconnected via wired and/or wireless connections. The configuration of components of network 100 illustrated in FIG. 1A is for illustrative purposes only. Other configurations may be implemented. Therefore, network 100 may include additional, fewer and/or different components than those depicted in FIG. 1A. Also, in some instances, one or more of the components of network 100 may perform one or more functions described as being performed by another one or more of the components of network 100.

Network 100 may comprise a SIP oriented network 100, such as: an all Internet Protocol (IP) network using SIP proxies 106; an IP Multimedia Subsystem (IMS) network using SIP proxies 106; and/or a Long Term Evolution (LTE) network with Voice over LTE using SIP proxies 106. SIP is a request/response protocol used for signaling in, for example, voice over IP networks. In addition to SIP proxies 106, network 100 may include SIP soft-switches, and SIP gateways (not shown) that facilitate signaling in a SIP oriented network 100.

In SIP, the peer-to-peer relationship between two devices is known as a "dialog." The dialog provides the context to facilitate exchange of messages between devices (including, for example, user devices 112 and AEPSs 108$a$-108$n$) in network 100. Messages exchanged between devices can be, for example, either a request or associated responses to the request. A request and its responses may be referred to as a "transaction." The devices in network 100 may communicate using a connection oriented protocol, such as transmission control protocol (TCP) and/or a connectionless communication protocol, such as user datagram protocol (UDP) or IP. A dialog may include one or more transactions. In network 100, for example, user device 112-1 may subscribe to an event-package provided by AEPSs 108$a$-108$n$. The subscription may be established using one of proxies 106 and a session control protocol, such as SIP, as described below.

User devices 112 may include mobile telephones, personal digital assistants (PDAs), laptop computers, desktop computers, tablet computers, or another type of computation or communication device. User devices 112 may connect to network 102 via wired, wireless, and/or optical connections. User devices 112 may include a transceiver (not shown) to transmit and receive SIP messages. User devices 112 may include user agents 114 that implement SIP according to the Internet Engineering Task Force (IETF) document Request For Comments (RFC) 2543 and document RFC 3261. User agents 114 may be implemented for a single address of record (AOR) that corresponds to a single user. The AOR includes a user name and a domain with which the AOR is associated. There may be multiple instances of a single AOR. For example, an end user may log in to a messaging application on multiple user devices 112 including a mobile phone, personal computer, and PDA. Corresponding user agents 114 in this instance are all registered to a single AOR. User agents 114 may register and subscribe for SIP services in network 100 through proxies 106.

Each of proxies 106 may include a device that facilitates the establishment, definition, and termination of sessions, such as telephone calls, on behalf of other devices in network 100 (e.g., user devices 112). Proxies 106 may be aggregated to form a SIP proxy farm that is associated with a particular SIP domain. Network 100 may include a load balancer (not shown in FIG. 1) for the SIP proxy farm. Proxies 106 may route requests to user device's 112 locations, authenticate and authorize user devices 112 for services provided through proxies 106, implement call-routing policies, and provide features to user devices 112. The services and features provided through proxies 106 may include event-packages, which are services on network 100 for which the devices 112 can subscribe and receive notifications. SIP event-packages may be provided through an integrated SIP soft-switch or alternately, through AEPSs 108a-108n, for instance as described in RFC 3265 (SIP specific event notification) and RFC 3903 (SIP extension for event state publication).

Each of AEPSs 108a-108n may provide auxiliary event-packages to subscribing user devices 112 on network 100 through proxies 106. AEPSs 108a-108n may comprise hardware, software or a combination of hardware and software that hosts auxiliary event-packages and provides the auxiliary event-packages to authorized and/or authenticated devices using a network protocol. Each of AEPSs 108a-108n may host a same auxiliary event-package. These auxiliary event-packages may be unknown to the SIP soft-switch and SIP gateway. The auxiliary event-packages provide access to extenuating or ancillary actions to a published event, such as contingent access to a database or other predetermined action. According to one implementation, a particular soft-switch may have a particular set of extensions defined by an event-package that is integrated with the soft-switch. An auxiliary event-package may be implemented in network 100 to extend features of user agent 114 and user device 112 with features that are not included in the event-package for the soft-switch. The auxiliary event-package may be specific to a particular network 100 and may not be supported by a CPE (customer premises equipment) vendor or manufacturer of a particular user device 112. AEPSs 108a-108n may support applications and functionality that is specific to and provided by the telecommunications service provider that maintains network 100.

AEPSs 108a-108n may distribute particular feature sets, such as presence to subscribing user devices 112 or user agents 114. For example, a user agent 114 in network 100 may update a presence status by publishing information regarding presence of the device. In this instance, the auxiliary event-package is a third party event-package to a SIP soft-switch. However, AEPSs 108a-108n may not be tightly integrated with the SIP soft-switch and issues may arise with regards to load balancing network 100.

Application server 104 may support access side protocols in network 100 including SIP, media gateway control protocol (MGCP) and network-based call signaling (NCS). Application server 104 may include a database of user and group profiles as well as service and subscription data. According to one implementation, application server 104 and adapters 110a-110n of AEPSs 108a-108n comprise a SIP publisher client cluster. Application server 104 may publish SIP messages to AEPSs 108a-108n. Adapters 110a-110n may be collocated and communicate with AEPSs 108a-108n. Adapters 110a-110n may receive a published SIP message from application server 104 and transform the published SIP message, for example, into a notification message input to AEPSs 108a-108n (designated as notify in the SIP protocol). AEPSs 108a-108n may output the notification message to subscribing user devices 112 or user agents 114 through proxies 106. The published SIP message may be distributed via network 102 to subscribers of that auxiliary event-package, as described below.

Network 102 may include a wired or wireless network. Network 102 may include a wireless public land mobile network (PLMN) (e.g., a cellular network). The PLMN may include a Code Division Multiple Access (CDMA) 2000 PLMN, a Global System for Mobile Communications (GSM) PLMN, an LTE PLMN and/or other type of PLMN. In addition to a wireless network, network 102 may include one or more other networks of various types, such as, for example, a telecommunications network (e.g., a Public Switched Telephone Network (PSTN)), a local area network (LAN), a wide area network (WAN), a metropolitan area network (MAN), an intranet, the Internet, and/or a cable network (e.g., an optical cable network). Network 102 may also include a wireless satellite network.

In instances in which SIP event-packages are auxiliary to the SIP soft-switch and/or unknown to the SIP soft-switch, SIP gateway or proxy, the presence of these auxiliary event-packages in SIP oriented network 100 increases the difficulty of load-balancing SIP oriented network 100. Signal diagrams described below demonstrate implementations of a SIP client-centric server-affinity process that allows fail-over and load-balancing of a SIP oriented network 100.

Figure 1B:
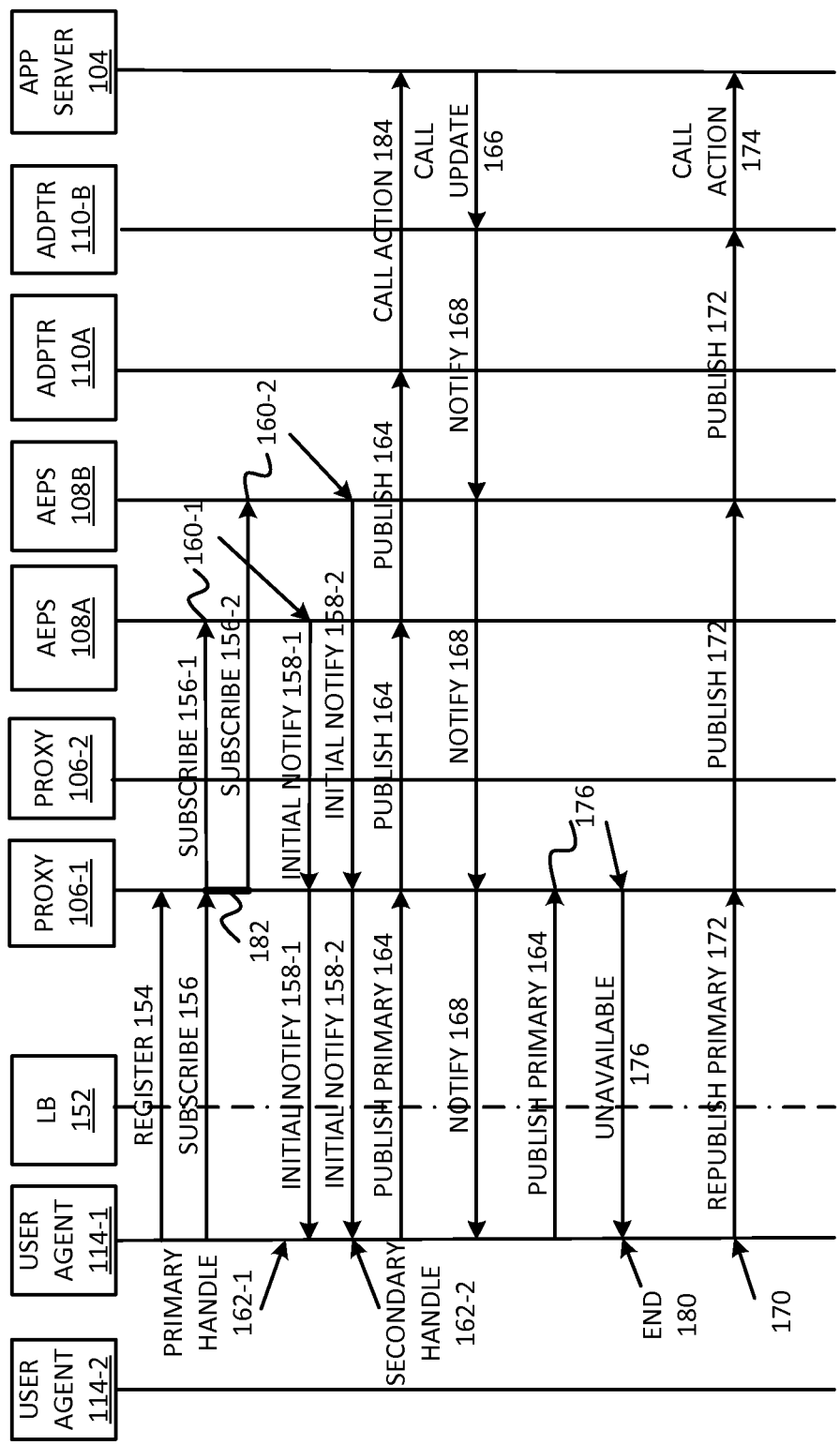
FIG. 1B is a signal diagram of exemplary messages implementing a SIP client centric server-affinity that allows failover and load balancing of a network.
Figure 1C:
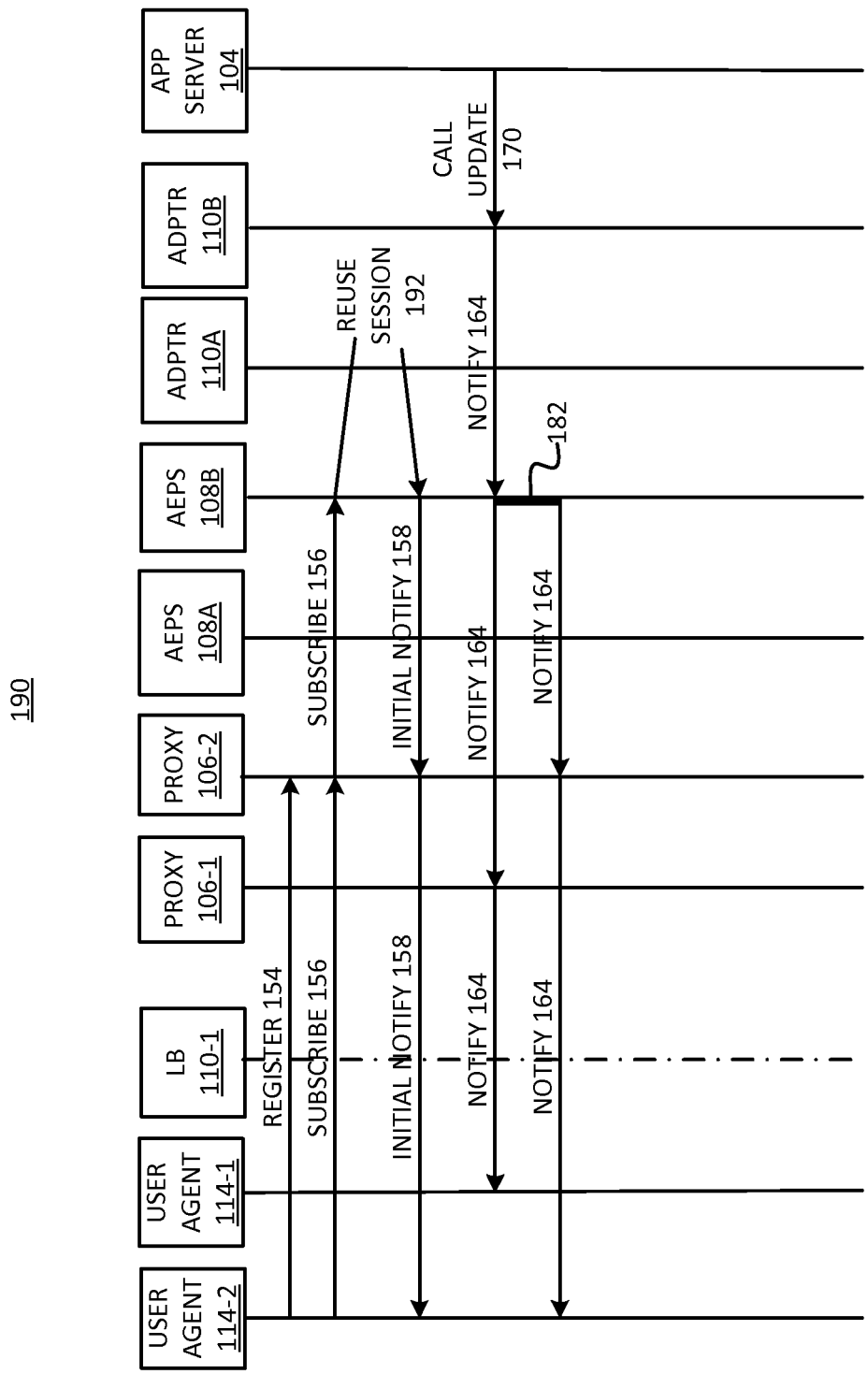
FIG. 1C is a signal diagram of exemplary messages implementing a new subscription to an existing SIP session with an auxiliary event-package in a network.

FIGS. 1B and 1C illustrate signal diagrams 150 and 190, respectively, of exemplary dialogs implementing a SIP client centric server-affinity that allows failover and load balancing of a SIP oriented network 100. As illustrated, signal diagrams 150 and 190 may include transactions between user agents 114 (user agent 114-1 and user agent 114-2), a load balancer (LB) 152, proxies 106, AEPSs 108a-108n, and application server 104. The transactions illustrated in FIGS. 1B and 1C are for illustrative purposes only. Other transactions may be implemented. Therefore, signal diagrams 150 and 190 may include additional, fewer and/or different components and/or transactions than those depicted in FIGS. 1B and 1C. Also, in some instances, one or more of the components of signal diagrams 150 and 190 may perform one or more transactions described as being performed by another one or more of the components of signal diagrams 150 and 190.

Referring to FIG. 1B, signal diagram 150 illustrates dialog implementing load balancing and failover of an auxiliary event-package. User agent 114-1 may register 154 with proxy 106, in this instance proxy 106-1. LB 152 may be used in this instance to route an initial connection between user agent 114-1 and proxies 106. For example, user agent 114-1 may make a registration request that LB 152 may subsequently redirect to one of the proxies 106 based on LB's 152 determination of an appropriate proxy 106 (in this instance proxy 106-1) that achieves load balancing requirements of network 100. The load balancing performed by LB 152 occurs at a separate level of network 100 than load balancing performed with AEPSs 108a-108n, described below. User agent 114-1 may achieve additional load balancing requirements of network 100 by directing publications and notifications to and from the auxiliary event package to particular AEPSs 108.

User agent 114-1 may subscribe 156 to an auxiliary event-package located in a SIP domain maintained by proxy 106-1. The auxiliary event-package may be provided through AEPSs 108a-108n. AEPSs 108a-108n may have registered with proxy 106-1 prior to user agent 114-1 registering 154 with proxy 106-1. Proxy 106-1 may fork 182 (as defined in RFC 3261) the subscription 156 (subscribe 156-1, subscribe 156-2) to all registered AEPSs 108a-108n that maintain that auxiliary event-package (in this instance AEPS 108a and AEPS 108b). For example, proxy 106 may fork 182 the subscription 156 by forwarding the single subscription 156 to multiple endpoints, which in this case corresponds to each of the plurality of AEPSs 108a-108n.

AEPSs 108a-108n may respond with a normal accept (designated as a 200 series message in SIP protocol) and an initial notify 158 (notify 158-1 and notify 158-2 from AEPS 108a and AEPS 108b, respectively). User agent 114-1 may receive an accept notification (not shown) and initial notify 158 for all instances of the auxiliary event-package in the SIP domain of proxy 106-1. The first (initial) notify 158 received by user agent 114-1 (i.e., the first initial notify 158 of initial notifies 158 corresponding to each of AEPSs 108a-108n) is acknowledged and the sending AEPS 108 (in this instance AEPS 108a) becomes the primary handle (e.g., primary server and/or primary device that handles the auxiliary event-package for user agent 114-1) or the primary subscription. The remaining responses are designated and processed as secondary handle(s) (e.g., secondary server(s) and/or secondary device(s) that handles the auxiliary event-package for user agent 114-1). User agent 114-1 may acknowledge the notification (not shown) and at or near that time a new session 160 becomes active (new session 160-1 and new session 160-2 for AEPS 108a and AEPS 108b, respectively). AEPS 108a and AEPS 108b may both consider the subscription to the auxiliary event-package as active at that instant.

Load balancing of AEPSs 108a-108n in network 100 occurs where user agent 114-1 selects one of AEPSs 108a-108n as the primary handle. Subsequent to selection of the primary handle, the selected AEPSs 108 becomes the primary handle that user agent 114-1 communicates with to execute transactions regarding the auxiliary event package. The AEPSs 108 that responds first becomes the primary handle. Those of AEPSs 108a-108n that are busy/unavailable may respond at a later time than AEPSs 108a-108n that have comparatively lower workloads. Therefore, AEPSs 108a-108n may be load balanced according to response times, which may be based on workload of AEPSs 108a-108n.

User agent 114-1 may maintain subscriptions to each of the other AEPSs 108a-108n. The other AEPSs 108a-108n are identified as secondary handles. User agent 114-1 may refresh subscriptions periodically according to an expired header field or expired header tag, received for instance in a SIP message such as notify 158, before an expiration timer terminates the subscription. User agent 114-1 communicates with the primary handle (AEPS 108a) for subsequent transactions. Additionally, user agent 114-1 may keep the subscription active for the secondary handle(s). From that point forward, user agent 114-1 may publish to the primary handle (AEPS 108a), and may expect notifications from both the primary handle and secondary handle(s).

User agent 114-1 may publish 164 via proxy 106-1 and direct the publish request to the primary handle (AEPS 108a). User agent 114-1 may direct any response in a pub/sub architectural pattern to a particular instance of an AOR. For instance, user agent 114-1 may direct the response to a location subscription to a particular user agent 114. Application server 104 may receive a publish 164 message and perform a call action in response. Application server 104 may subsequently issue a call update 166 through adapter 110B that initiates a notify 168 that is directed to a particular instance of an AOR, which in this case corresponds to user agent 114-1.

According to a further implementation, the primary handle (AEPS 108a) may become unavailable for providing the auxiliary event-package. For example, the hosting server for AEPS 108a may become unavailable. User agent 114-1 requires the primary handle (in this instance AEPS 108a) to be available only at instances in which user agent 114-1 is to perform a specific action, for example, to output another publication (publish 164). Proxy 106-1 may receive information regarding the unavailable status of AEPS 108a. For instance, proxy 106-1 may determine the unavailable status of AEPS 108a based on either discovering the unavailable status or based on failure of a refresh rebind process for AEPS 108a. In response to publish 164 from user agent 114-1, proxy 106-1 may provide notification that the primary handle is unavailable 176. Proxy 106-1 may provide notification by either sending a client status code message (i.e., a 480 SIP message) or a server error status code message (i.e., a 503 SIP message) based on the particular implementation of proxy 106-1.

Upon receipt of the notification that the primary handle is unavailable 176, user agent 114-1 may select a secondary handle as a new primary handle (AEPS 108b) and release the now former primary handle (AEPS 108a). User agent 114-1 may attempt to maintain a subscription state for the former primary handle. User agent 114-1 may attempt to reestablish a connection to the former primary handle (AEPS 108a) at a predetermined refresh rate. User agent 114-1 may publish 164 (republish to primary 172) to the new primary handle (AEPS 108b).

According to another implementation, all AEPSs 108a-108n may receive a publication or option from user agent 114-1 indicating to the plurality of AEPSs 108a-108n an identity of the primary handle from the plurality of AEPSs 108a-108n and which of the plurality of AEPSs 108a-108n are secondary handle(s). User agent 114-1 may limit notifications and publications to and from the auxiliary event-package to the primary handle. If the primary handle becomes unavailable (e.g., maintenance period or network failure, etc.), user agent 114-1 may receive a SIP 480/Unavailable message from proxy 106 that maintains that auxiliary event-package instance. At that instant, user agent 114-1 may change a server-affinity to one of the available secondary handles (each in turn) optionally sending a notification or option request indicating that change to AEPS 108b (i.e., a change from secondary to primary affinity). All subsequent notifications and publications will then be re-directed from, and to, that auxiliary event-package instance, AEPS 108b. Once the previously unavailable auxiliary event-package instance (i.e., AEPS 108a) becomes available again, the next client subscription refresh may be forked 182, and establish AEPS 108a (again, via the accept and initial notify 158) as a secondary handle in user agent 114-1.

The foregoing implementation may be applied to either a stateful or stateless auxiliary event-package, allow multiple subscriptions per AOR (i.e., AOR instances) and establish server-affinity (i.e., affinity to a particular AEPS 108) at the time of subscription, and re-establish server-affinity on upon receiving SIP 480/Unavailable message, and on upon refresh re-subscribe. A stateless auxiliary event-package treats each request as an independent transaction. A stateful auxiliary event-package has a current state that may be dependent on past states and/or transactions. The implementation may utilize current standards for SIP communication between a proxy and an event-package, and may enable a developer or network administrator to load balance without regard to the soft-switch, gateway or proxy vendor, or the network environment in which the soft-switch is placed.

Turning now to FIG. 1C, signal diagram 190 illustrates an exemplary dialog implementing a new subscription to an existing SIP session with an auxiliary event-package in network 100. As illustrated, transactions in signal diagram 190 may follow transactions or be performed concurrently with transactions illustrated in signal diagram 150.

As shown in FIG. 1C, user agent 114-2 initializes in network 100 and registers 154 with proxy 106-2. User agent 114-2 may comprise a second instance of an AOR associated with user agent 114-1. User agent 114-2 may subscribe 156 to an auxiliary event-package via proxy 106-2 of the proxy cluster. The auxiliary event-package may be hosted by AEPSs 108a-108n.

Proxy 106-2 sends a subscription request (subscribe 156) to AEPS 108b. Subscribe 156 may reuse a session 192 that has been previously established by an instance of an AOR, such as a session established by user agent 114-1 in signal diagram 150. Note that network 100 may include a subscription layer and a session layer. User agent 114-2 may have a same session as user agent 114-1 at the session layer of network 100 and a new active subscription at the subscription layer of network 100. For instance, with reference back to FIG. 1B, subscribe 156 may reuse session 160-2 at AEPS 108b that was established by user agent 114-1. Multiple instances of an AOR may have parallel use of a single session, for instance initiating a telephone call on one user device 112-1 and participating in the telephone call on another user device 112-2.

User agent 114-2 may receive an initial notify 158 from AEPS 108b. AEPS 108b becomes the primary handle for user agent 114-2. According to this implementation, a single AOR or user may have two user agents 114 (user agent 114-1 and user agent 114-2). For example, a user may sign in to a presence application on multiple devices, such as a PDA and a mobile phone. Application server 104 may respond with a call update 170 to adapter 110b that is sent as a notify 164 to AEPS 108b. There are two subscriptions to the auxiliary event-package at AEPS 108b in this instance. AEPS 108b may fork 182 the notify 164 (e.g., send notify 164-1 to user agent 114-1, notify 164-2 to user agent 114-2) to both subscribing user agents 114 via proxies 106 (proxy 106-1, proxy 106-2) corresponding to each user agent 114. In this manner, an end user may reuse an existing session of the auxiliary event package at an AEPS 108 for additional user agents 114 and corresponding user devices 112.

Figure 2:
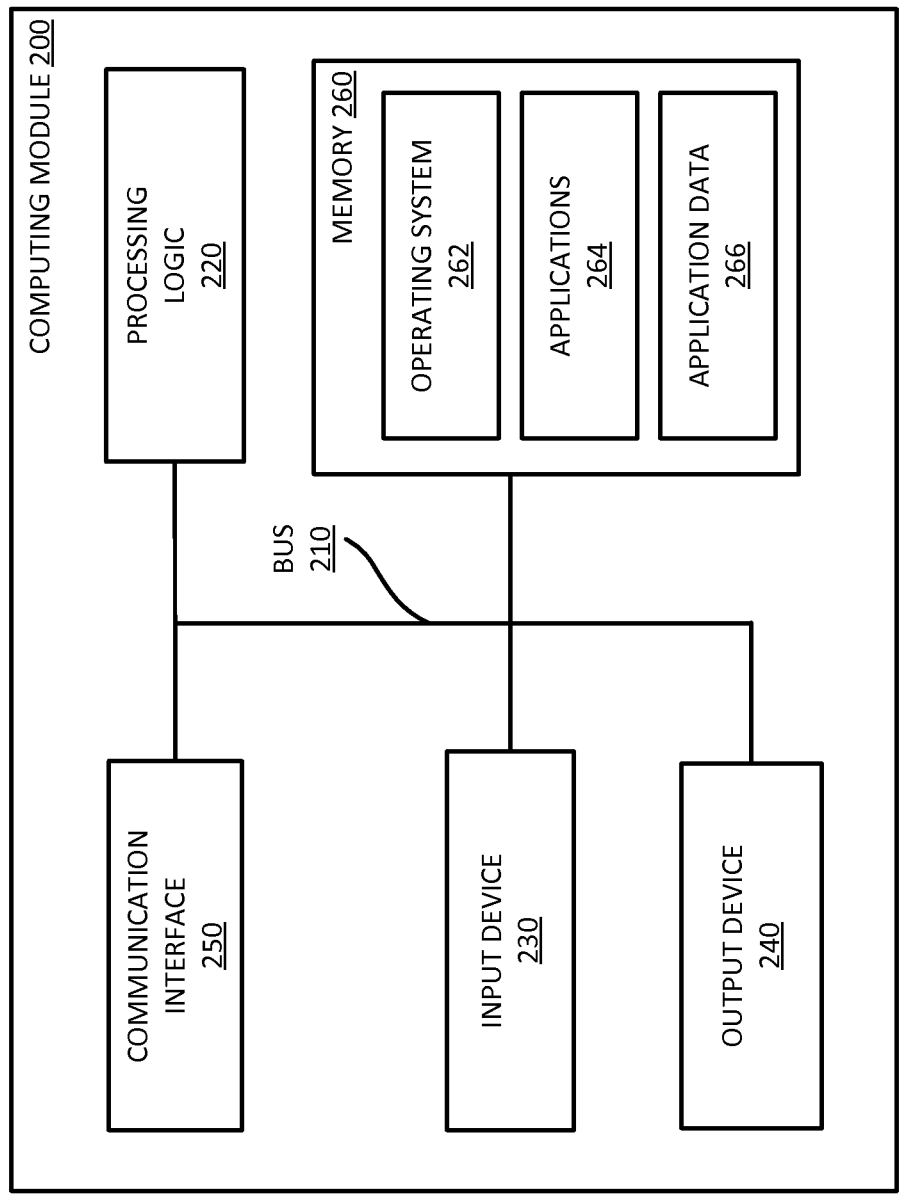
FIG. 2 is a block diagram of exemplary components of a computing module 200.

Devices in network 100 may each include one or more computing modules. FIG. 2 is a block diagram of exemplary components of a computing module 200. Computing module 200 may include a bus 210, processing logic 220, an input device 230, an output device 240, a communication interface 250, and a memory 260. Computing module 200 may include other components (not shown) that aid in receiving, transmitting, and/or processing data. Moreover, other configurations of components in computing module 200 are possible.

Bus 210 may include a path that permits communication among the components of computing module 200. Processing logic 220 may include any type of processor or microprocessor (or families of processors or microprocessors) that interprets and executes instructions. In other embodiments, processing logic 220 may include an application-specific integrated circuit (ASIC), a field-programmable gate array (FPGA), a multi-core processor, a reduced-instruction set code (RISC) processor, etc.

Input device 230 may allow a user to input information into computing module 200. Input device 230 may include a keyboard, a mouse, a pen, a microphone, a remote control, an audio capture device, an image and/or video capture device, a touch-screen display, etc. Some user devices 112, such as home phone may include a keypad for entering telephone numbers when calling a party. Other user devices, such as a mobile phone, may include a keypad or a touch screen for entering numbers for calling a party. On the other hand, SIP proxies 106 may be managed remotely and may not include input device 230. In other words, some devices may be "headless" and may not include a keyboard, for example.

Output device 240 may output information to the user. Output device 240 may include a display, a printer, a speaker, etc. For example, user devices 112 may include a liquid-crystal display (LCD) for displaying information to the user, such as the name and/or number of a calling party. Headless devices, such as proxy 106, may be managed remotely and may not include output device 240.

Input device 230 and output device 240 may allow a user to activate and interact with a particular service or application, such as telephone application to call a party. Input device 230 and output device 240 may allow a user to receive and view a menu of options and select from the menu options. The menu may allow the user to select various functions or services associated with applications executed by computing module 200.

Communication interface 250 may include a transceiver that enables computing module 200 to communicate with other devices or systems. Communication interface 250 may include a transmitter that converts baseband signals to radio frequency (RF) signals or a receiver that converts RF signals to baseband signals. Communication interface 250 may be coupled to an antenna for transmitting and receiving RF signals. Communication interface 250 may include a network interface card, e.g., Ethernet card, for wired communications or a wireless network interface (e.g., a WiFi) card for wireless communications. Communication interface 250 may also include, for example, a universal serial bus (USB) port for communications over a cable, a Bluetooth™ wireless interface, a radio-frequency identification (RFID) interface, a near-field communications (NFC) wireless interface, etc.

Memory 260 may store, among other things, information and instructions (e.g., applications 264 and operating system 262) and data (e.g., application data 266) for use by processing logic 220. Memory 260 may include a random access memory (RAM) or another type of dynamic storage device, a read-only memory (ROM) device or another type of static storage device, and/or some other type of magnetic or optical recording medium and its corresponding drive (e.g., a hard disk drive).

Operating system 262 may include software instructions for managing hardware and software resources of computing module 200. For example, operating system 262 may include Linux, Windows, OS X, OpenSolaris, Unix, etc. In instances in which user device 112 is a mobile phone, for example, operating system 262 may include MeeGo, Android, WebOS, iOS, Symbian, etc. Applications 264 and application data 266 may provide network services or include applications, depending on the device in which the particular computing module 200 is implemented.

In an exemplary implementation, computing module 200 may perform the operations described herein in response to processing logic 220 executing software instructions contained in a computer-readable medium, such as memory 260. A computer-readable medium may be defined as a physical or logical memory device. The software instructions may be read into memory 260 from another computer-readable medium (e.g., a hard disk drive (HDD), SSD, etc.), or from another device via communication interface 250. Alternatively, hard-wired circuitry may be used in place of or in combination with software instructions to implement processes consistent with the implementations described herein. Thus, implementations described herein are not limited to any specific combination of hardware circuitry and software.

Figure 3:
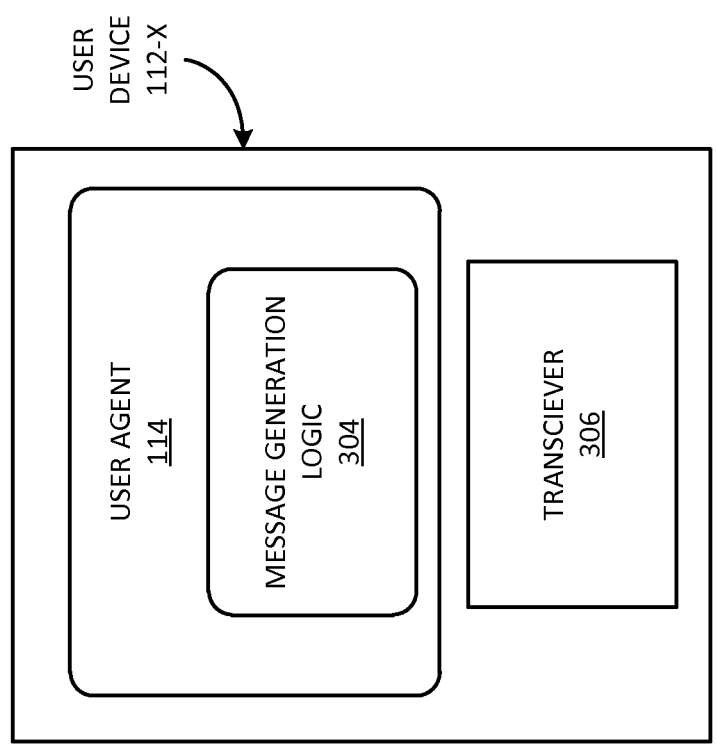
FIG. 3 is a block diagram of exemplary components of one or more of the devices of FIG. 1A.

FIG. 3 is a block diagram of exemplary components of user device 112. User devices 112 may each include a transceiver 306 and a user agent 114, which may further include message generation logic 304. The components of device 112-x are shown for ease of understanding and simplicity. Device 112-x may include more, fewer, or a different arrangement of components.

User agent 114 may use a protocol (e.g., SIP) to establish, define, and terminate sessions with other devices. A session may include a lasting connection between two devices that may carry a stream of packets from one device to the other and/or vice versa. User agent 114 may perform the functions of a user agent client (UAC) and/or a user agent server (UAS). A UAC is a logical entity that creates a new request, and then uses client transaction state logic to send the request. The role of UAC may last for the duration of that transaction. In other words, if device 112-x initiates a request, user agent 114 acts as a UAC for the duration of that transaction. On the other hand, a UAS is a logical entity that generates a response to a SIP request. The response accepts, rejects, or redirects the request. The role of UAS may last for the duration of that transaction. In other words, if device 112-x responds to a request, user agent 114 acts as a UAS for the duration of that transaction.

Transceiver 306 may receive and transmit SIP messages included in a SIP dialog. SIP dialog may be identified by a combination of the Call-ID, From tag and To tag. A SIP transaction is identified by the branch parameter of the Via header and the Method name in the CSeq field. These fields can be used to construct respective dialog ID and transaction ID identifiers.

Figure 4A:
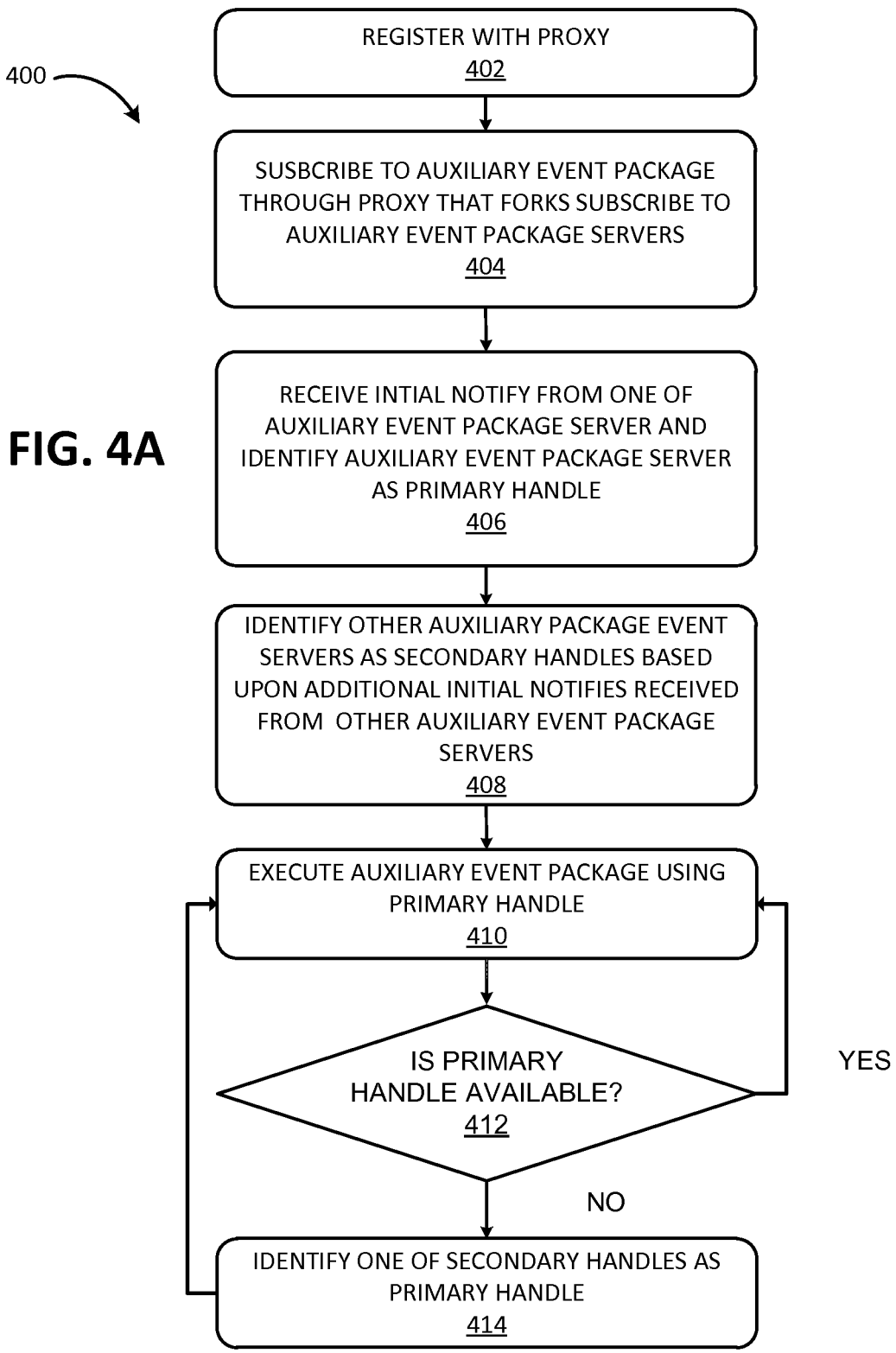
FIG. 4A is a flowchart of an exemplary process for implementing a SIP client centric server-affinity that allows failover and load balancing of a network.

FIG. 4A is a flowchart of an exemplary process 400 for implementing load balancing and failover of an auxiliary event-package in network 100, etc. The data flows associated with process 400 are described in conjunction with signal flow 150 in FIG. 1B. Process 400 may execute in a user agent 114 and/or user device 112 (e.g., mobile phone, personal computer). It should be apparent that the process discussed below with respect to FIG. 4A represents a generalized illustration and that other elements may be added or existing elements may be removed, modified or rearranged without departing from the scope of process 400. Although FIG. 4A is described with respect to a user agent 114-1, processes described in FIG. 4A may also be applied with respect to user devices 112.

At block 402, user agent 114-1 may register 154 with proxy 106. For example, user agent 114-1 may send a registration request to a load balancer (e.g., load balancer 152) in network 100 that redirects the registration request to a particular proxy 106 in a SIP proxy farm. Proxy 106 may register user agent 114-1. Proxy 106 may previously have registered a plurality of auxiliary event-package servers, AEPSs 108a-108n, that host an auxiliary event-package. The auxiliary event-package may be unknown to the SIP soft-switch and SIP gateway, and may extend functionality of user devices 112 on network 100. The auxiliary package may extend a feature set of user device 112. For instance, the auxiliary event-package may comprise a location service that publishes a location of user agent 114 to subscribers of the location service.

At block 404, user agent 114-1 may subscribe 156 to the auxiliary event-package through proxy 106. For example, user agent 114-1 may subscribe 156 to a location event-package that may include a third party event-package to network 100. Proxy 106 may fork 182 the subscription request 156 to AEPSs 108a-108n, which host instances of the auxiliary event-package. According to an implementation, proxy 106 forks 182 the subscribe 156 (sends subscribe 156-1, subscribe 156-2) to all instances of AEPSs 108a-108n.

At block 406, an initial notify is received from each of AEPSs 108a-108n by user agent 114-1 and selected as a primary handle for the auxiliary event-package. Each of AEPSs 108a-108n may send an initial notify in response to receiving subscribe 156 messages received from user agent 114-1. Each AEPS 108 may process respective subscribes 156 received and send initial notifies 158 based on workload. For example, an AEPS 108 that has a comparatively heavy workload may be slower in responding than an AEPS 108 with a comparatively light workload. User agent 114-1 may identify a primary handle based on respective times that initial notifies 158 are received from each of AEPSs 108a-108n. According to an implementation, user agent 114-1 identifies the sender of a first initial notify 158 (illustrated as notify 158-1 in FIG. 1B) that user agent 114-1 receives as a primary handle for the auxiliary event-package for user agent 114-1 and may establish server-affinity at that time to the primary handle. Subsequent to identifying the primary handle, user agent 114-1 communicates with the particular AEPSs 108 that serves as the primary handle to access features of the auxiliary event-package.

At block 408, user agent 114-1 may identify other AEPSs 108a-108n as secondary handles based upon additional initial notifies 158 received from other AEPSs 108a-108n. According to an implementation, user agent 114-1 may identify other AEPSs 108a-108n that sent initial notifies that are received later than a first initial notify 158 as secondary handles. User agent 114-1 maintains active subscriptions to the auxiliary event-package for the secondary handles.

At block 410, user agent 114-1 may communicate with primary handle to execute the auxiliary event-package. For example, user agent 114-1 may publish to the primary handle and receive notifies 168 in response to call actions 184 and ensuing call updates 166 from an application server 104 in network 100.

According to an implementation, at block 412, user agent 114-1 may determine whether the primary handle is available. In instances in which the primary handle is available, user agent 114-1 continues to execute transactions with the auxiliary event package using the primary handle.

At block 414, in response to a determination at block 412 that the primary handle is unavailable, user agent 114-1 may identify one of the secondary handles as a new primary handle. For example, user agent 114-1 may receive a SIP 480/Unavailable message indicating that the primary handle (a particular AEPS 108) is unavailable from proxy 106. Subsequent to identifying the new primary handle, user agent 114-1 communicates with the particular AEPSs 108 that serves as the primary handle to access features of the auxiliary event-package (Block 410). Additionally, user agent 114-1 may reestablish a connection to the former primary handle once the former primary handle becomes available. The former primary handle is then identified as a secondary handle.

Figure 4B:
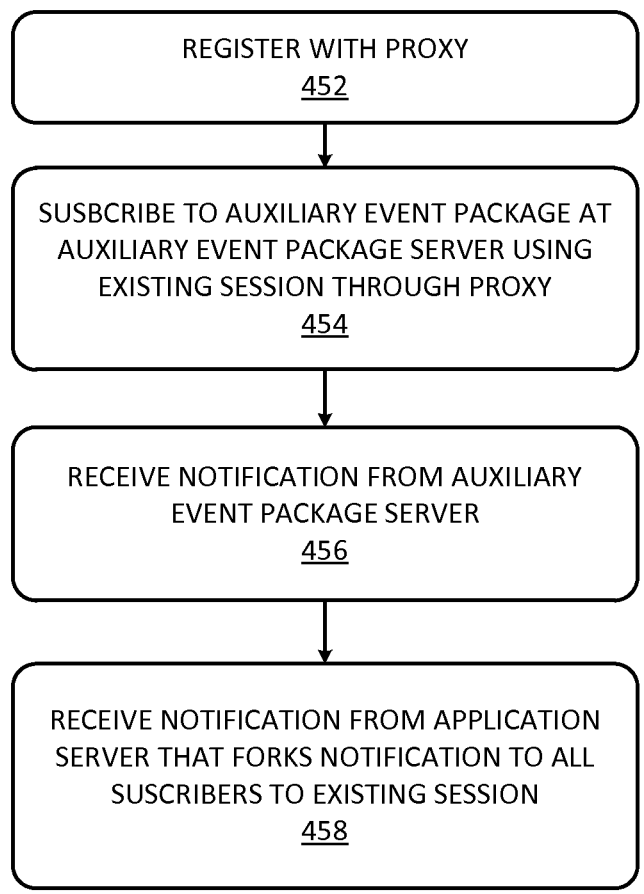
FIG. 4B is a flowchart of an exemplary process for implementing a new subscription to an existing SIP session with an auxiliary event-package in a network.

FIG. 4B is a flowchart of an exemplary process 450 for implementing a new subscription to an existing SIP session with an auxiliary event-package in network 100. The data flows associated with process 400 are described in conjunction with signal flow 190 in FIG. 1C. Process 450 may execute in a user agent 114 and/or user device 112 (e.g., mobile phone, personal computer). It should be apparent that the process discussed below with respect to FIG. 4B represents a generalized illustration and that other elements may be added or existing elements may be removed, modified or rearranged without departing from the scope of process 450. Although FIG. 4B is described with respect to a user agent 114-2, processes described in FIG. 4B may also be applied with respect to user devices 112. Although, process 450 is described as executing in network 100 subsequent to process 400 and may use existing sessions and information determined in process 400, it should be understood that process 450 may be implemented independently (e.g., concurrently, before, after) of process 400.

User agent 114-2 may register with proxy 106 (block 452). For example, user agent 114-2 may send a registration request to a load balancer (e.g., load balancer 152) in network 100 that redirects the registration request to proxy 106. Proxy 106 may register user agent 114-2.

At block 454, user agent 114-2 may subscribe 156 to the auxiliary event-package through proxy 106. Proxy 106 may redirect a subscription request (subscribe 156) to an existing session 160 for the auxiliary event-package at an AEPS 108.

At block 456, user agent 114-2 may receive an initial notify 158 from AEPS 108. User agent 114-2 thereby reuses session 192 that was initiated by user agent 114-1.

According to an implementation, at block 458, application server 104 may issue a call update 170 to AEPS 108 through an adapter 110. For instance, application server 104 may issue the call update 170, which is converted to a notify 164 by proxy 106. Proxy 106 forks 182 the notification (notify 164-1, notify 164-2) to all subscribing user agents 114 for the auxiliary event-package.

The foregoing description provides illustration and description, but is not intended to be exhaustive or to limit the embodiments to the precise form disclosed. Modifications and variations are possible in light of the above teachings or may be acquired from practice of the invention. For example, while series of signal flows have been described with respect to FIGS. 1B and 1C and series of acts have been described with regard to the flowcharts of FIGS. 4A and 4B, the order of the signals flows and acts may differ in other implementations. Further, non-dependent signal flows and acts may be performed in parallel.

Although embodiments described herein in the context of SIP and an Internet Protocol (IP)-based network, in other implementations equivalent or analogous communication protocols (e.g., International Telecommunication Union (ITU) H.323) and/or types of transport networks (e.g., asynchronous transfer mode (ATM), frame relay, etc.) may be used. Both the ITU H.323 standard and the IETF's SIP standard are examples of protocols that may be used for establishing a communications session among terminals, such as devices 112, connected to a network. Further, a combination of such protocols may be applied in various parts of the overall system.

Embodiments, as described above, may be implemented in many different forms of software, firmware, and hardware in the implementations illustrated in the figures. The actual software code or specialized control hardware used to implement the exemplary embodiments described herein is not limiting of the invention. Thus, the operation and behavior of the embodiments were described without reference to the specific software code—it being understood that one would be able to design software and control hardware to implement the embodiments based on the description herein.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method comprising:
   registering, by a user device, with a proxy for an auxiliary event-package, wherein the auxiliary event-package is provided by a plurality of auxiliary event-package servers;
   subscribing to the auxiliary event-package through the proxy, wherein the proxy forwards the subscription to the plurality of auxiliary event-package servers;
   receiving, from each of the plurality of auxiliary event-package servers, an accept notification and an initial notify;
   selecting, by the user device, one of the plurality of auxiliary event-package servers as a primary handle for the auxiliary event-package, wherein selecting the one of the auxiliary event-package servers as the primary handle for the auxiliary event-package comprises receiving a first notify message from the one of the auxiliary event-package servers prior to a notify message from the others of the plurality of auxiliary event-package servers and wherein the user device is configured to publish to the primary handle; and
   identifying others of the plurality of auxiliary event-package servers as secondary handles for the auxiliary event-package, wherein the user device is operable to receive notifications from the primary handle and the secondary handles.

2. The computer-implemented method of claim 1, wherein selecting, by the user device, the one of the auxiliary event-package servers as the primary handle for the auxiliary event-package further comprises indicating to the plurality of auxiliary event-package servers an identity of the primary handle from the plurality of auxiliary event-package servers and limiting notifications and publications to and from the auxiliary event-package to the primary handle.

3. The computer-implemented method of claim 1, further comprising:
   executing the auxiliary event-package using the primary handle.

4. The computer-implemented method of claim 1, further comprising:
   determining that the primary handle is unavailable to execute the auxiliary event-package; and
   identifying one of the secondary handles as a new primary handle.

5. The computer-implemented method of claim 1, wherein the auxiliary event-package comprises at least one of a stateful event-package and a stateless event-package.

6. The computer-implemented method of claim 1, further comprising:
   performing at least one of a refresh or a re-subscribe; and
   reestablishing server-affinity to the one of the auxiliary event-package servers.

7. The computer-implemented method of claim 1, wherein subscribing to the auxiliary event-package through the proxy comprises subscribing to an auxiliary event-package server that accepts multiple subscriptions for each address of record.

8. The computer-implemented method of claim 1, further comprising:

subscribing to the auxiliary event-package at the one of the auxiliary event-package servers, wherein the auxiliary event-package servers has an existing session for the auxiliary event-package; and receiving a notification from the one of the auxiliary event-package servers indicating that the one of the auxiliary event-package servers has added the subscription to the existing session for the auxiliary event-package.

9. The computer-implemented method of claim 1, wherein the auxiliary event-package comprises at least one of a location service and a presence service.

10. A device comprising:
a memory to store a plurality of instructions; and
a processor configured to execute instructions in the memory to:
 register with a proxy for an auxiliary event-package, wherein the auxiliary event-package is provided via a plurality of auxiliary event-package servers;
 subscribe to the auxiliary event-package through the proxy, wherein the proxy forwards the subscription to the plurality of auxiliary event-package servers;
 select one of the auxiliary event-package servers as a primary server for the auxiliary event-package, wherein selecting the one of the auxiliary event-package servers as the primary handle for the auxiliary event-package comprises receiving a first notify message from the one of the auxiliary event-package servers prior to a notify message from the others of the plurality of auxiliary event-package servers and wherein the device is configured to publish to the primary handle; and
 identify others of the plurality of auxiliary event-package servers as secondary servers for the auxiliary event-package.

11. The device of claim 10, wherein when selecting the one of the auxiliary event-package servers as the primary server for the auxiliary event-package, the processor is configured to indicate to the plurality of auxiliary event-package servers an identity of the primary server from the plurality of auxiliary event-package servers and limit notifications and publications to and from the auxiliary event-package to the primary server.

12. The device of claim 10, wherein the processor is further configured to execute the auxiliary event-package using the primary server.

13. The device of claim 10, wherein the processor is further configured to:
determine that the primary server is unavailable to execute the auxiliary event-package; and
identify one of the secondary servers as a new primary server.

14. The device of claim 10, wherein the processor is further configured to:
perform at least one of a refresh or a re-subscribe; and
reestablish server-affinity to the one of the auxiliary event-package servers.

15. The device of claim 10, wherein the processor is further configured to subscribe to the auxiliary event-package at the one of the auxiliary event-package servers, wherein the auxiliary event-package servers has an existing session for the auxiliary event-package; and
receive a notification from the one of the auxiliary event-package servers indicating that the one of the auxiliary event-package servers has added the subscription to the existing session for the auxiliary event-package.

16. A non-transitory computer-readable medium including instructions to be executed by a processor, the instructions including one or more instructions, which when executed by the processor, for causes the processor to:
 register, by a user device, with a proxy for an auxiliary event-package, wherein the auxiliary event-package is provided by a plurality of auxiliary event-package servers;
 subscribe to the auxiliary event-package through the proxy, wherein the proxy forwards the subscription to the plurality of auxiliary event-package servers;
 receive an initial notify message from one of the auxiliary event-package servers;
 select, by the user device, the one of the auxiliary event-package servers as a primary server for the auxiliary event-package, wherein selecting the one of the auxiliary event-package servers as the primary handle for the auxiliary event-package comprises receiving a first notify message from the one of the auxiliary event-package servers prior to a notify message from the others of the plurality of auxiliary event-package servers and wherein the user device is configured to publish to the primary handle;
 identify others of the plurality of auxiliary event-package servers as secondary servers for the auxiliary event-package; and
 execute the auxiliary event-package using the primary server.

17. The non-transitory computer-readable medium of claim 16, where the one or more instructions further includes instructions for causing the processor to:
determine that the primary server is unavailable to execute the auxiliary event-package; and
identify one of the secondary servers as a new primary server.

18. A system comprising:
a plurality of auxiliary event-package servers configured to provide an auxiliary event-package;
a session initiation protocol (SIP) proxy; and
a user device comprising:
 a memory to store a plurality of instructions; and
 a processor configured to execute instructions in the memory to:
  subscribe to the auxiliary event-package through the proxy, wherein the proxy forwards the subscription to the plurality of auxiliary event-package servers;
  receive a first initial notify message from one of the auxiliary event-package servers prior to a notify message from the others of the plurality of auxiliary event-package servers;
  select the one of the auxiliary event-package servers that sends the first initial notify message as a primary server for the auxiliary event-package, wherein the user device is configured to publish to the primary handle; and
  identify others of the plurality of auxiliary event-package servers as secondary servers for the auxiliary event-package; and
 a transceiver to transmit and receive SIP messages.

* * * * *